Feb. 18, 1947.  A. R. MANGNALL  2,416,058
CONSTRUCTION OF MACHINE FRAMEWORKS
Filed Feb. 16, 1944  6 Sheets-Sheet 1

Inventor
A. R. Mangnall

Feb. 18, 1947.  A. R. MANGNALL  2,416,058
CONSTRUCTION OF MACHINE FRAMEWORKS
Filed Feb. 16, 1944   6 Sheets-Sheet 2
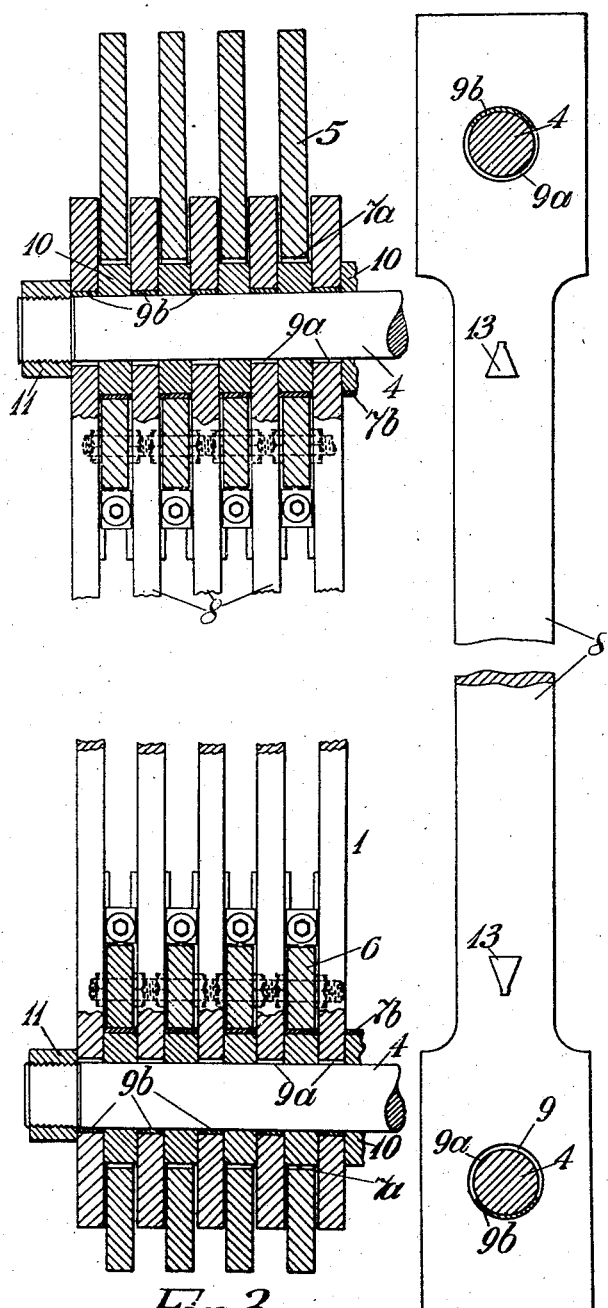
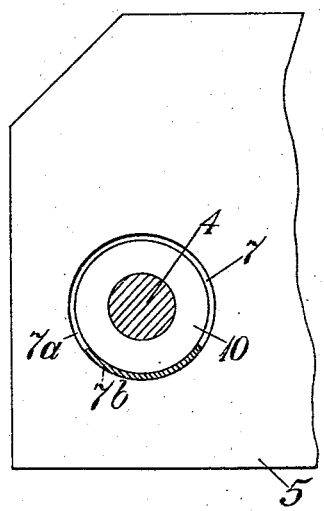
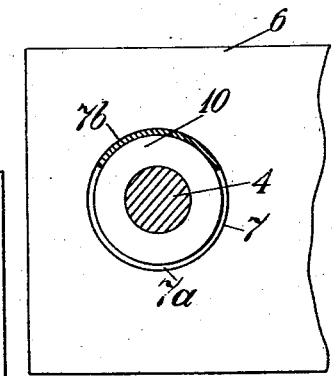
Fig.3.   Fig.4.   Inventor
A. R. Mangnall Feb. 18, 1947.  A. R. MANGNALL  2,416,058
CONSTRUCTION OF MACHINE FRAMEWORKS
Filed Feb. 16, 1944  6 Sheets-Sheet 3
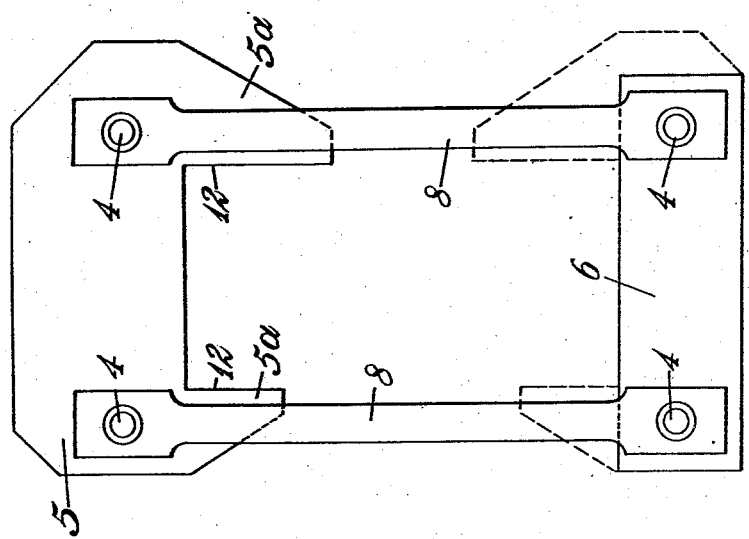
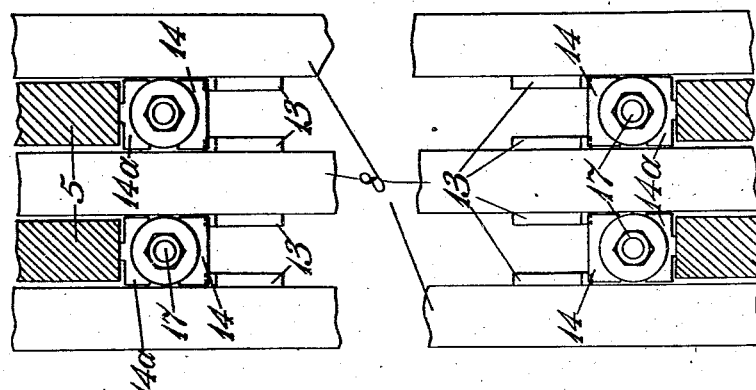
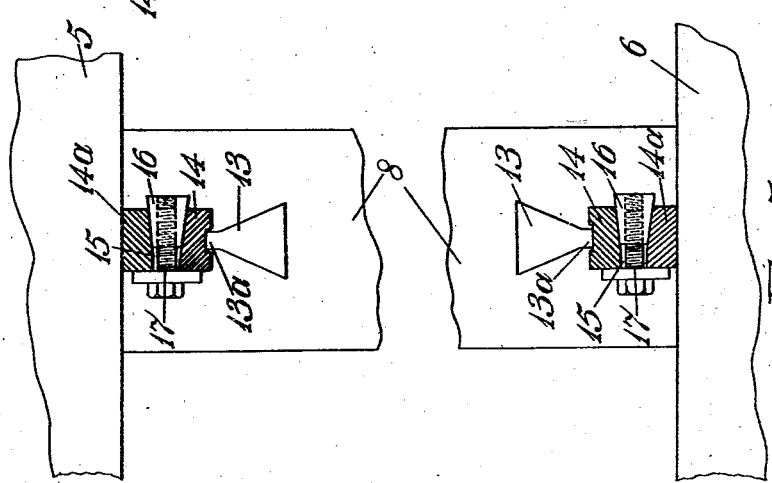

Feb. 18, 1947. A. R. MANGNALL 2,416,058
CONSTRUCTION OF MACHINE FRAMEWORKS
Filed Feb. 16, 1944 6 Sheets-Sheet 4

Inventor
A. R. Mangnall
By Glascock Downing & Seebold
Attys

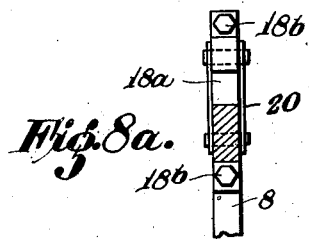
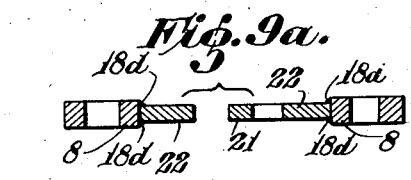

Patented Feb. 18, 1947

2,416,058

UNITED STATES PATENT OFFICE 2,416,058

CONSTRUCTION OF MACHINE FRAMEWORKS

Arthur Rivington Mangnall, Chester, England, assignor to The Hydraulic Engineering Company Limited, Chester, England Application February 16, 1944, Serial No. 522,682
In Great Britain July 23, 1942

5 Claims. (Cl. 100—70)

This invention relates to machine frameworks and particularly to such (for instance hydraulic vertical ram presses) as involve a bed or base frame joined by vertical sides or columns to an overhead frame or head and which it is the present practice to form as solid castings.

The invention has for its object to provide an improved construction of machine frameworks which involves ease of assembly and construction and enables the frameworks to be added to or subtracted from at will to increase or diminish the working capacity or field of the machinery or mechanism assembled thereon.

The invention consists in a laminated machine framework comprising a cross frame part connected between a pair of laterally spaced column parts wherein each such part is composed of a plurality of plate elements connected together by connecting means which when a bending stress is applied to the cross frame permits the plates of the latter to move relatively to the plates of the column parts in the direction of the applied stress so that this stress may be converted wholly into tensile stress in the plates of the column parts exerted in the direction of the length thereof.

In the accompanying drawings—

Figures 1, 2:
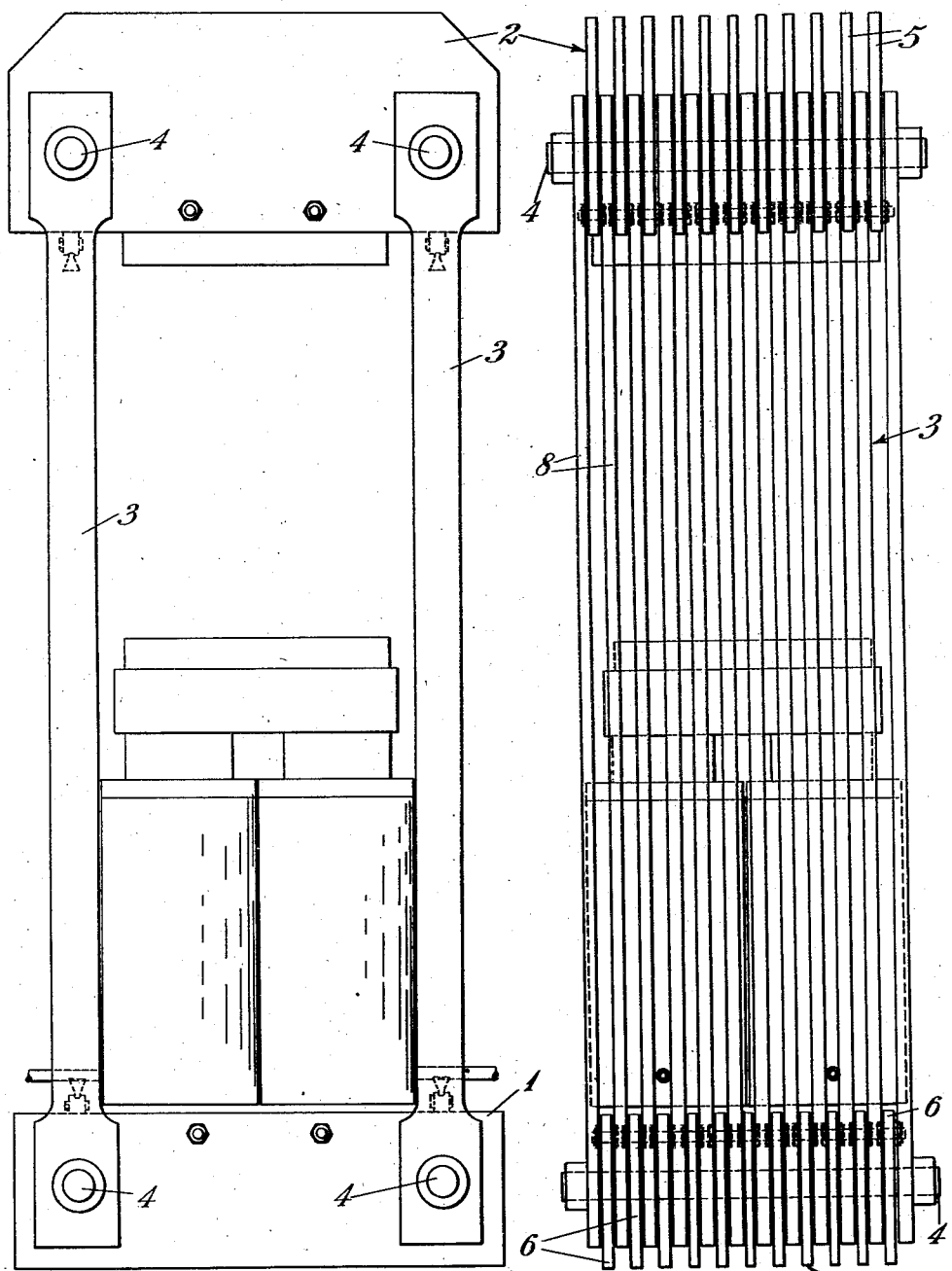
Figure 8:
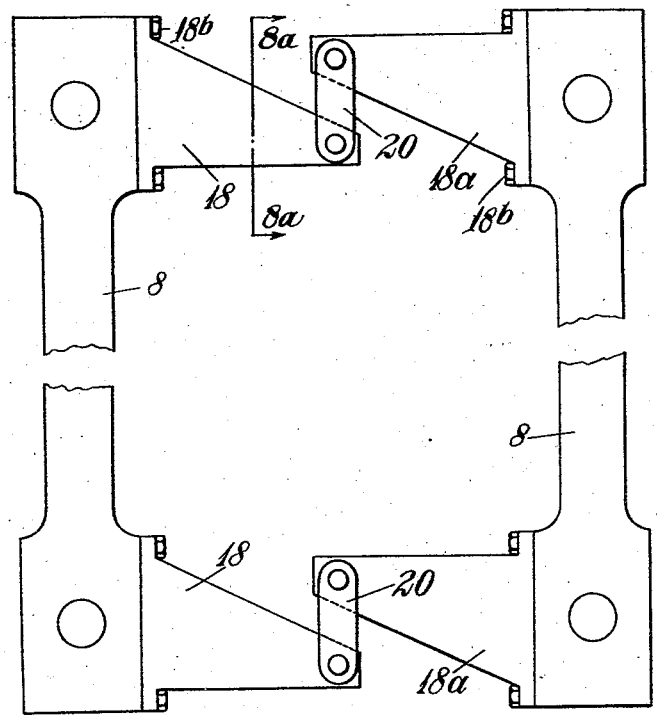
Figure 9:
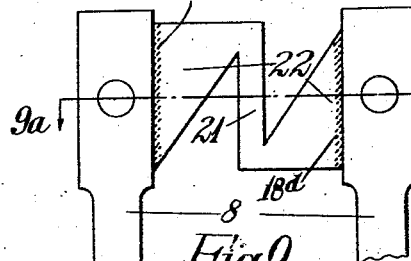
Figure 10:
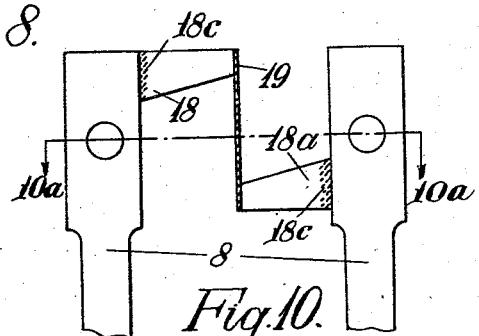
Figure 11:
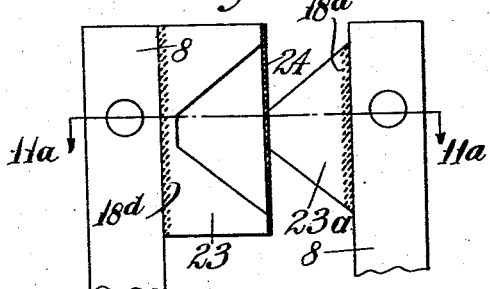
Figure 12:
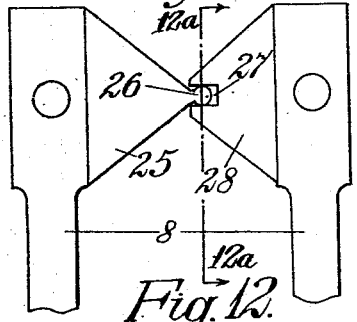
Figure 13:
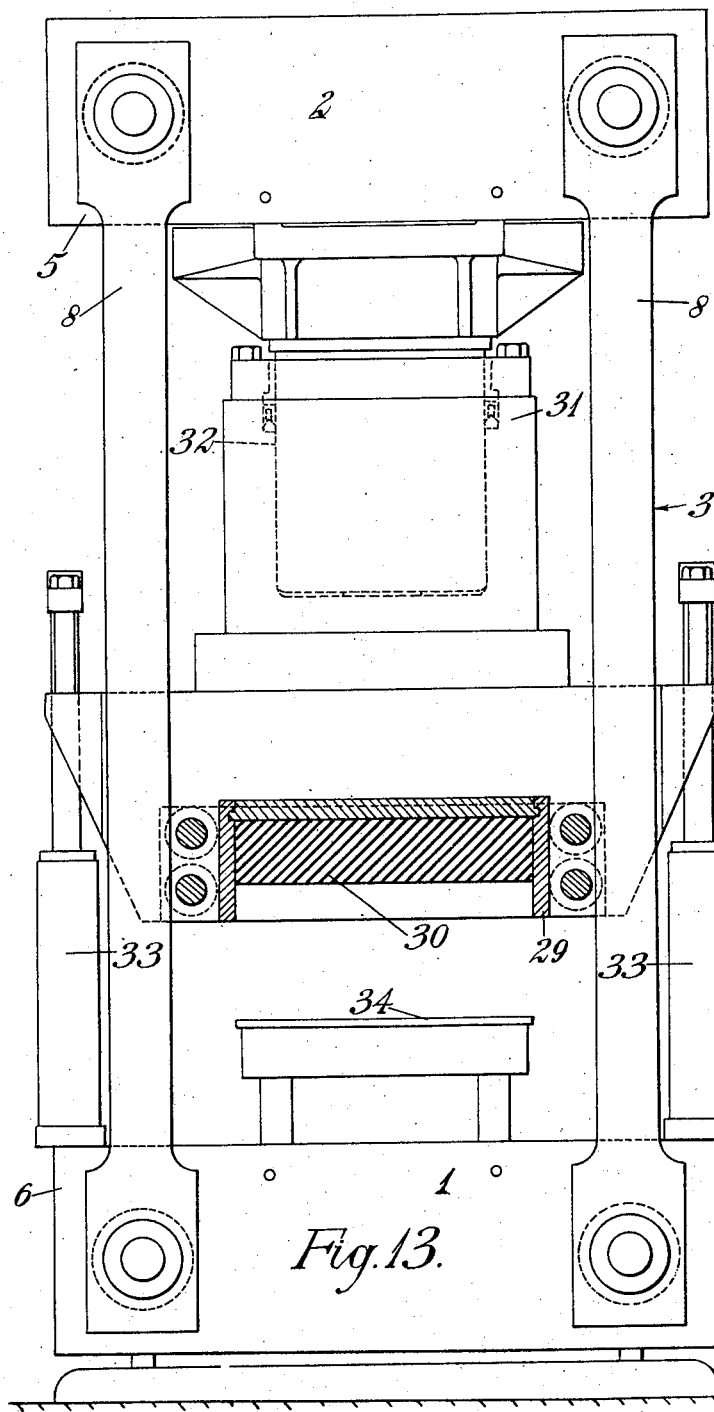

Figure 1 is an end elevational view of a press having its framework constructed in accordance with the invention, Figure 2 is a side view of Figure 1, Figure 3 is a fragmentary and part sectional side view of the press as shown in Figure 1 but illustrating on an enlarged scale at the top and bottom of the figure the mode of connection of the column plates with the head and base plates respectively, Figure 4 is a fragmentary and exploded side elevational view of one form of the column, base and head plates employed in accordance with the invention, Figure 5 is a fragmentary end and part sectional view showing the wedge connections employed at the top and bottom ends of a column plate to take up clearances provided initially to facilitate the assembly of the laminated plate structure of the sides, base and head of the press framework, Figure 6 is a side view of Figure 5, Figure 7 shows a modified construction of the cross plates employed to form the base and head of a framework, Figure 8 is a side elevational view of an adjacent pair of vertical plates (the central portions of which are broken away for ease of illustration) and of a construction of the transverse connecting plates for these vertical plates, Figure 8a is a section on the line 8a—8a of Figure 8, Figure 9 is a fragmentary elevational view illustrating an alternative construction of transverse connecting plate, Figure 9a is a section on the line 9a—9a of Figure 9, Figure 10 is a fragmentary elevational view illustrating yet a further construction of transverse connecting plate, Figure 10a is a section on the line 10a—10a of Figure 10, Figure 11 is a fragmentary elevational view illustrating a still further construction of transverse connecting plate, Figure 11a is a section on the line 11a—11a of Figure 11, Figure 12 is a fragmentary elevational view illustrating yet another construction of transverse connecting plate, Figure 12a is a section on the line 12a—12a of Figure 12 and Figure 13 is a view in elevation of a press of the "down-stroking" type.

In carrying the invention into effect in one convenient manner a machine framework which, in the specific example illustrated in Figure 1, comprises a base 1, a head 2 and vertical sides or columns 3, is built up from a plurality of flat plates, which would generally be of steel, assembled and secured together by transverse screw-threaded rods 4 furnished with nuts to form a laminated structure which can be added to or subtracted from at will simply by removing the through bolts and adding or removing the plates as required.

The head and base as shown in Figures 2 to 7, are each composed of a plurality of similar flat plates 5 and 6 respectively each having an aperture 7 at its opposite ends through which the corresponding through bolts may pass and disposed upon the through bolts so as to alternate between the end portions of elongated flat plates 8, which form the vertical sides or columns of the machine framework, these being indicated generally by the reference 3 in Figure 1.

The vertical column plates 8 may be composed of single vertical plates as shown in Figure 4, for example, or opposite pairs of such plates may be joined together at their top and bottom ends by single transverse plates welded or otherwise joined to their respective vertical plates or such transverse connections may be formed to provide for limited free expansion and contraction movements to take place and for this purpose may take a variety of forms as illustrated in Figures 8 to 12 and described later.

Near their ends each column plate 8 is provided with an aperture 9, so that in the assembled condition of the plates there are four such apertures in all located near the corners of the rectangular frames constituted thereby, and these apertures (which, in the assembled condition of the plates, provide a close fit for the screw-threaded rods 4 serving to secure the plates together) coincide with the corresponding apertures 7 in the other plate members 5 and 6, including the central apertures in bushes or collars 10 fitted into the enlarged apertures 7 in the intervening rectangular plates 5 and 6 and through which central apertures the screw-threaded rods pass with a close fit. The bushes or collars 10 are somewhat thicker than the transverse plates 5 and 6 so that when all the plate members have been assembled together and the screw-threaded rods 4 inserted, a tightening of securing nuts 11 at the projecting ends of the bolts will produce a tightening of the column plates against the ends of the adjacent bushes. The arrangement provides that the column plates shall be in tension and subjected to no side loading on account of the head part of the framework, the separate intervening rectangular plates 5 and 6 of which are capable of independent deflection about the bearing surfaces afforded by the said bushings 10. In other words the connection of the plates of the head with the plates of the columns is such that if stress is applied to the head, tending to bend the latter, the plates thereof are permitted to move relatively to the plates of the columns in the direction of the applied stress so that this stress is converted wholly into tensile stress in the plates of the columns exerted in the direction of the length thereof.

The intervening plates 5 in the head part of the framework may, as shown in Figure 7, be formed to have depending extensions 5a at their ends, and the outer edges of the extensions, which function like cantilevers, may, as shown in the figure, taper outwards and upwards to the outer edges of the intervening plates on which they are provided. These depending extensions may serve to enclose horizontal side rams provided upon the press and the extensions may be of equal length or be unequal as shown in Figure 7.

When applied to a press employing an overhead elastic pad, such for instance as a loaded rubber pad, enclosed in a box and against the surface of which pad pattern pieces carried on a vertically reciprocable table are pressed, the rubber pad can be housed or accommodated within a grid-like frame formed separately from the cross-head or frame and mounted independently thereof, the grid-like frame being built into laminated form from separate plates and recessed to receive the rubber pad or the box containing the latter generally as illustrated in Figure 13.

As above indicated, the apertures 7 provided in the intervening plates 5 and 6 for the passage of the bushings 10 provide a degree of clearance which, however, is taken up in the completed framework, to avoid all end play and wear, by these plates being stressed outwards in the direction of the working stresses as by the actuation prior to the tightening of the securing nuts on the screwed rods, of expanding rods connected between the aligned intervening plates in the head and the bed parts of the complete framework structure or by other suitable means provided for the same purpose. Thus, and as illustrated in Figures 4, 5 and 6 the clearance fits provided not only between the bushes 10 and the apertures 7 in the head and base plates 5 and 6 respectively but also between the through bolts 4 and the apertures 9 in the vertical side or column plates 8 and which facilitate the assembly of the various plates are taken up by a wedge action as follows:

The clearance between the apertures 7 and the bearing bushes 10 is clearly seen in Figures 3 and 4 and is indicated by the reference 7a. The clearance fit between the apertures 9 in the vertical plates 8 and the through bolts 4 is also clearly seen in these two figures and indicated by the reference 9a. Either loosely inserted in these apertures 7 and 9 or secured thereto, or to the bolts and bushes, so as to take up the clearances there are arcuate bearing strips 7b and 9b disposed so that the one set of bearing strips (the strip 7b for instance) take up the clearance at the bottom and the other set (the set 9b for instance) take up the clearance at the top. The wedge action by which the various plates are stressed outwards to take up all end play and wear is obtained by providing the vertical plates 8 with side lugs 13, each of which on its outer end is formed with a central tongue portion 13a which engages in a corresponding recess in a stretcher block 14, of which there is a counterpart 14a, which is disposed to bear against the inner longitudinal edge of a head plate 5 or a base plate 6, as the case may be, to provide pairs of stretcher blocks which combine to form between them a central socket 15 of taper form to receive therein a conical plug 16 which is wedged into the socket by the operation of a screw bolt 17, which causes the pairs of stretcher blocks to be forced apart and thereby wedged tightly into contact with their respective head or base plates and the said lugs 13, whereby the desired tightening of the plates of the laminated plate structure is obtained. The engagement of the tongues 13a in the recesses of the stretcher blocks 14 prevents transverse movement of the latter with respect to their lugs 13 and thereby prevents the arrangement from working loose.

Referring to Figure 13, which as above indicated, illustrates a press of the "down-stroking" type, the frame being of the grid construction as described with reference to the preceding figures, encloses a box 29 housing the rubber pad 30 and takes up all the bursting stresses. The box is not moved up and down by the cylinder 31 and ram 32 arranged above it, the raising and lowering being effected by the side rams 33 in order to bring the box towards and away from the table 34, the ram 32 effecting the pressing operation when the box is in position against the table.

In such a construction while the overall width of the box may be considerable, the columns may be kept close together by the grid plates being made to pass through the spaces between the adjacent plates of the columns.

The invention enables machine frameworks to be built up from standardised units each composed of a preassembled series of column plates and intervening plates whereby to form a machine framework it is only necessary to take the requisite number of such units, depending upon the size of framework required, and secure them together side by side by through bolts passed through the units, and the framework is completed ready for the assembly of the operating parts thereon. It may be convenient to provide the pre-assembled plate units in full and part sections. For instance, sections of assembled plates may be provided which are equivalent to one half or another convenient fraction of a complete unit and which when used in association with one or more complete units provide for a greater degree of freedom in the building up of machine frameworks therefrom to suit particular requirements and sizes. The adjacent sections of pre-assembled plates may be maintained in spaced relation by means of spacing bushes loosely provided upon the through bolts.

The spaces between the plates may also be employed with particular advantage to accommodate guides by which the table of a press can be guided for the desired reciprocatory movement and which guides can therefore be of greatly increased length compared with those employed on the usual column or pillar type presses since the guides can, in the present construction of framework, be made to extend beyond the table and be held clear of the table cylinder by being accommodated within the said spaces.

The spaces which exist between the adjacent column plates of the units may be used to accommodate parts of the mechanism or apparatus of the machine for which the framework is constructed. For instance, these spaces may serve for the passage therethrough of the pipes of a hydraulic press.

It is obvious, of course, that the press framework can be adapted for use in any position. That is, it is not limited for use to form a vertical type press but can be applied to a horizontal type press or one which operates at an incline.

The intervening plates above referred to or the transverse connecting plates between the adjacent pairs of vertical plates 8 are preferably so constructed as to provide for compensation for temperature changes and unequal expansion of the base and head plates.

For instance, and as shown in Figures 8a, 10, and 10a, each transverse frame plate can be divided into two separate parts 18, 18a secured at their outer ends one to each column plate 8 and connected together at their inner ends either by a strip of spring steel 19 (Figures 10 and 10a) which extends generally in a plane parallel with the columns or by a connecting link 20 (Figures 8 and 8a), the two sections of each transverse plate being disposed in vertically stepped relationship upon the columns and the connection of the spring strip or link with one section being preferably such as will permit of an initial adjustment being effected. In Figures 8 and 8a the two plate parts 18, 18a are shown secured to the column plates by bolts having hexagonal heads 18b whereas in Figures 10 and 10a these two plate parts are shown secured to their respective column plates by lines of welding as indicated at 18c.

Alternatively, and as shown in Figures 9 and 9a, each transverse frame plate can be formed in one piece and have a central connecting portion 21 in the form of a central web extending parallel with the columns and joining similar triangular or other shaped portions 22 of the plate which extend from either side of the web and are secured to their respective columns by lines of welding 18d. Thus each transverse plate can be cut out from mild steel to have a central connecting web 21 which permits the desired expansion movements to take place.

Another construction, as shown in Figures 11 and 11a, consists in making each transverse plate in two parts each connected at its outer end to its respective column plate 8 also by lines of welding 18d and one part 23 having at its inner end a fork 23a across which a spring strip 24 is secured to lie in a central position between the columns and in a plane parallel therewith and to the central part of the free portion of which spring the inner end of the other arm 23a is connected as by welding.

Yet another construction which enables the required movements to take place, and which is shown in Figures 12 and 12a, involves forming each transverse plate in two half sections connected at their outer ends to their respective columns also by lines of welding and formed at their inner ends to have a jointed connection with each other such that the two sections of a transverse plate are free to partake of an expanding movement relatively to each other. Thus the inner end of one section 25 may be formed with a circular knob 26 which is accommodated within an open-ended slot 27 in the inner end of the other section 28, the slot extending perpendicular to the columns and the knob having sliding engagement with the transverse sides of the slot.

I claim:

1. A laminated machine framework comprising in combination a pair of laterally spaced column parts each composed of a plurality of separate plate elements, a cross frame part connected to extend between the column parts and composed also of a plurality of separate plate elements, the plate elements of the column and cross frame parts being disposed in parallel and laterally spaced relationship and in register one with the other in their respective parts, and end portions of the plates of the cross frame part being disposed in the spaces between end portions of the plates of the column parts so that these portions of the plates, which are provided with transverse apertures in register with one another, have an interleaved relationship with each other, bolt members connecting the plate elements of the cross frame part with the plates of the column parts and extending through the apertures in the interleaved portions of the plate elements in a direction transverse to the planes thereof, bush members in the apertures of the cross frame plates and encircling the bolt members so as to constitute bearing surfaces about which the plates of the cross frame may partake of movement relatively to the plates of the column parts in the direction of the applied stress, whereby this stress may be converted wholly into tensile stress in the plates of the column parts exerted in the direction of the length thereof, the apertures in the said plates being formed to provide on assembly of the framework a clearance fit between the bolt and bush members, and means being provided to take up this clearance after assembly of the framework and thereby prevent end play in the finished framework.

2. A laminated machine framework comprising in combination a pair of laterally spaced column parts each composed of a plurality of separate plate elements, a cross frame part connected to extend between the column parts and composed also of a plurality of separate plate elements, the plate elements of the column and cross frame parts being disposed in parallel and laterally spaced relationship and in register one with the other in their respective parts, and end portions of the plates of the cross frame part being disposed in the spaces between end portions of the plates of the column parts so that these portions of the plates have an interleaved relationship with each other, the said interleaved plate portions each having an aperture therein and the said apertures being in register with each other to provide a common transverse opening through each interleaved zone of the framework and bolt means extending through each said common transverse opening and serving to connect the plate elements of the cross frame part with the plates of the column parts, the apertures in the plates of the column parts approximating the diameter of their respective bolt element so that the latter has a relatively tight fit in these apertures and the apertures in the plates of the cross frame being formed to provide bearing surfaces about which these last mentioned plates can partake of relative movement, whereby when a bending stress is applied to the cross frame the plates of the latter are free to move relatively to the plates of the column parts in the direction of the applied stress and this stress may therefore be converted wholly into tensile stress in the plates of the column parts exerted in the direction of the length thereof.

3. A laminated machine framework according to claim 2 wherein the apertures in the plates of the cross frame part are of larger diameter than the diameter of their respective bolt element, and bush elements are secured in said apertures of larger diameter, the said bush elements serving to provide said bearing surfaces and through the medium of which bush elements the plate elements of the cross frame part are supported on their respective bolt elements.

4. A laminated machine framework according to claim 2 wherein the said bush elements are slightly thicker than the plates of the cross frame part whereby to provide a clearance fit between these plates and the adjacent plates of the column parts.

5. A laminated machine framework according to claim 2 wherein the cross frame part plate elements are formed to permit limited but free expansion and contraction movements of the cross frame.

ARTHUR RIVINGTON MANGNALL.

REFERENCES CITED

The following references are of record in the file of this patent:

UNITED STATES PATENTS

| Number | Name | Date |
|---|---|---|
| 545,758 | Aiken | Sept. 3, 1895 |
| 1,580,894 | Hummel | Apr. 13, 1926 |
| 1,662,197 | Macomber | Mar. 13, 1928 |

FOREIGN PATENTS

| Number | Country | Date |
|---|---|---|
| 15,222 | British | of 1904 |
| 272,753 | Italian | Mar. 20, 1930 |
| 301,779 | British | Dec. 13, 1928 |
| 560,229 | British | Mar. 27, 1944 |